Jan. 29, 1935.　　　B. C. CASE ET AL　　　1,989,268
APPARATUS FOR USE IN THE MANUFACTURE OF LAMINATED GLASS
Filed May 20, 1931　　　3 Sheets-Sheet 2
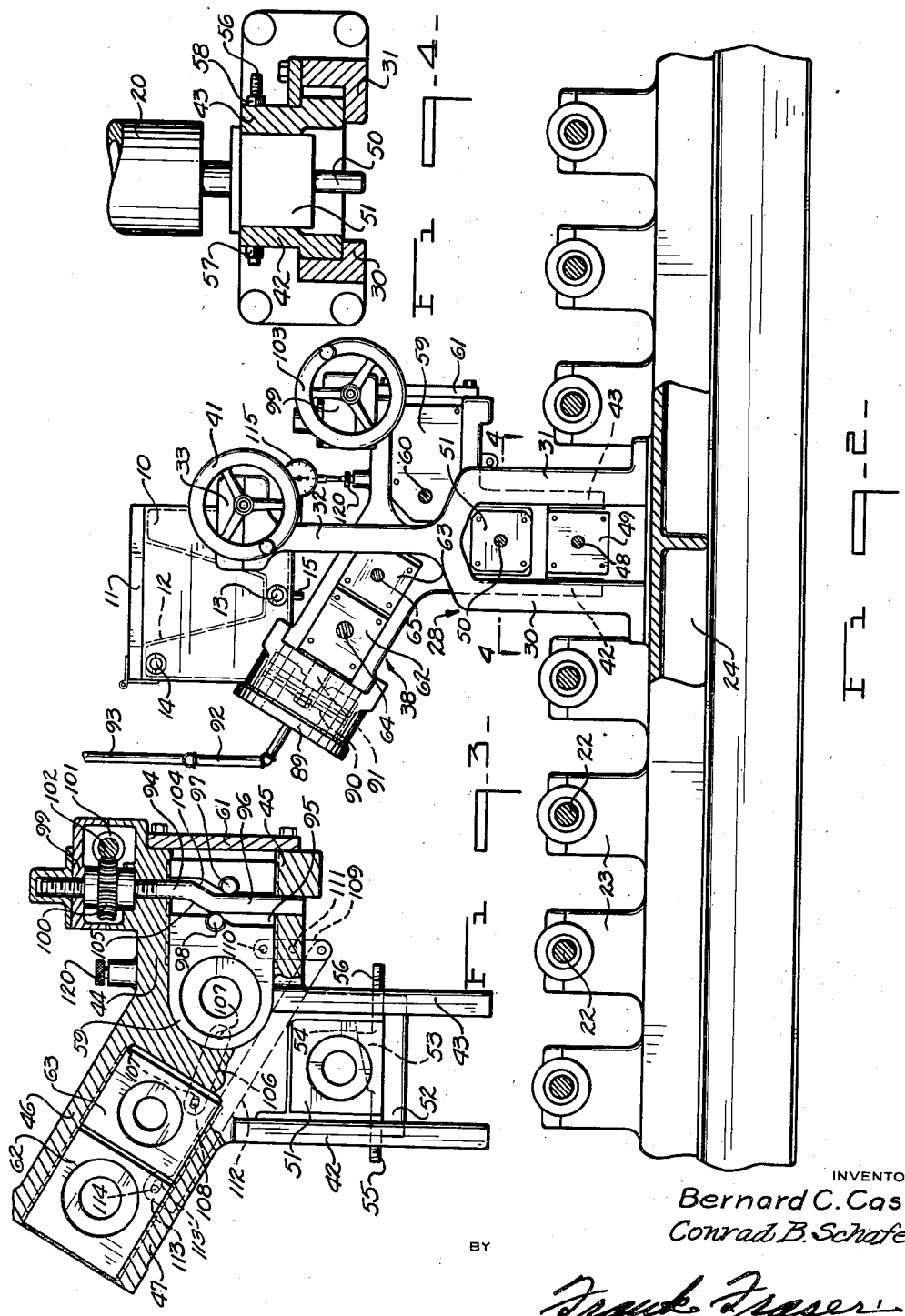
INVENTORS
Bernard C. Case
Conrad B. Schafer
BY
ATTORNEY Jan. 29, 1935.  B. C. CASE ET AL  1,989,268
APPARATUS FOR USE IN THE MANUFACTURE OF LAMINATED GLASS
Filed May 20, 1931  3 Sheets-Sheet 3
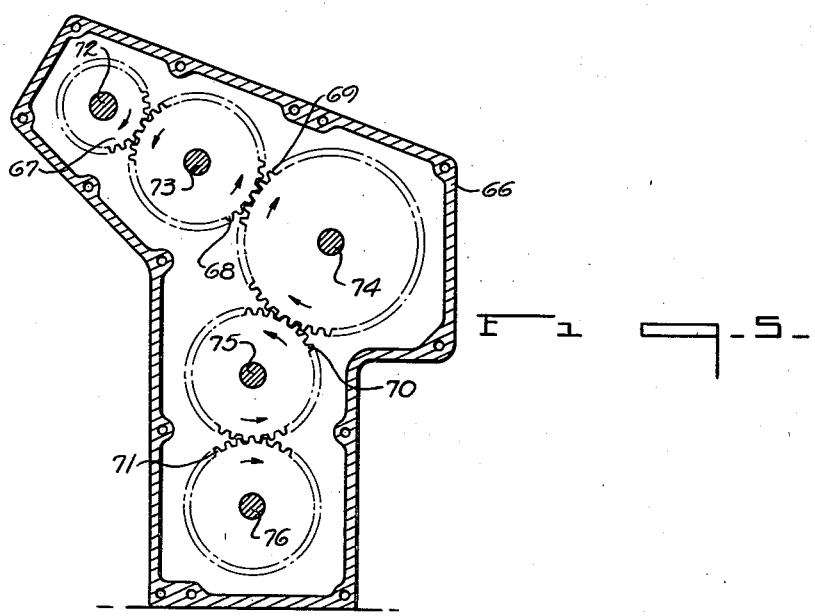
Fig. 5.
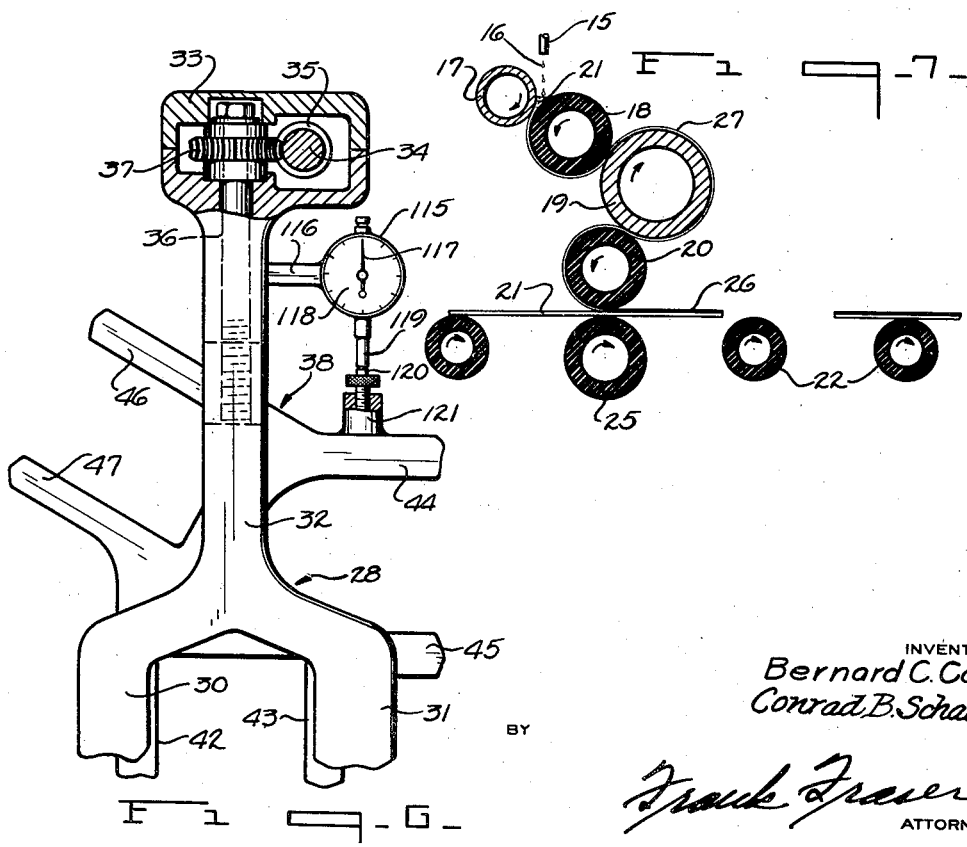
Fig. 7.
Fig. 6.
INVENTORS
Bernard C. Case
Conrad B. Schafer
BY Frank Fraser
ATTORNEY Patented Jan. 29, 1935

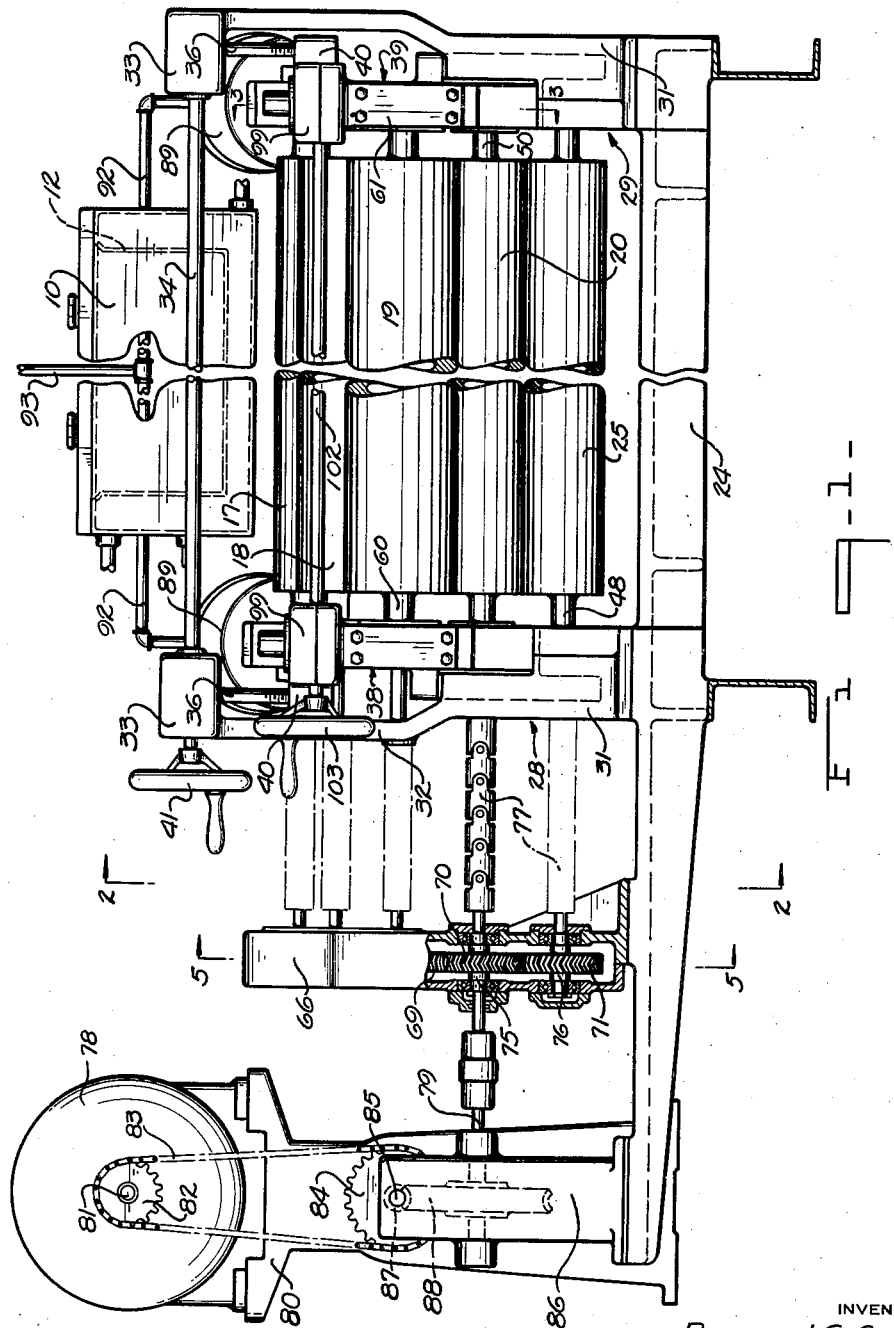

1,989,268

UNITED STATES PATENT OFFICE 1,989,268

APPARATUS FOR USE IN THE MANUFACTURE OF LAMINATED GLASS

Bernard C. Case and Conrad B. Schafer, Toledo, Ohio, assignors to Libbey-Owens-Ford Glass Company, Toledo, Ohio, a corporation of Ohio Application May 20, 1931, Serial No. 538,680

20 Claims. (Cl. 91—50)

The present invention relates to improvements in apparatus for use in the manufacture of laminated glass and more particularly to a novel apparatus or machine designed for treating the laminations with an adhesive or other bond-inducing medium preparatory to the assembling and uniting thereof.

The expression "laminated glass" is used to designate a composite structure ordinarily comprising two sheets of glass with an interposed non-brittle membrane, the three laminations being bonded together usually by the application of heat and pressure to form a unitary sheet. One of the main problems encountered in the production of this type of glass is the bonding together of the several laminations which includes the application of the desired adhesive or other bond-inducing medium thereto. In order to obtain the most satisfactory results, it is quite important that the adhesive or other bond-inducing medium be applied as uniformly as possible over the entire area of the glass being so treated whereby to insure a proper bonding together of the several laminations when subjected to heat and pressure.

The aim and principal object of this invention, therefore, resides in the provision of a novel apparatus or machine whereby the desired adhesive or other bond-inducing medium may be applied to the glass sheets in such a manner as to form a uniform coating over substantially the entire area thereof.

Another important object of the invention is in the provision of such an apparatus or machine of the character above described whereby the application of the adhesive or other bond-inducing medium to the glass sheets may be accomplished both rapidly and conveniently and in an accurate and economical manner.

A further object of the invention is the provision of apparatus of the above character embodying a plurality of rolls for applying the desired coating of adhesive or other bond-inducing medium to the glass sheets, together with novel means for mounting and adjusting the said rolls relative to one another.

Other objects and advantages of the invention will become more apparent during the course of the following description when taken in connection with the accompanying drawings.

In the drawings forming a part of this application and wherein like numerals are employed to designate like parts throughout the same, Fig. 1 is a front elevation of the apparatus or machine constructed in accordance with the present invention, Fig. 2 is a section taken substantially on line 2—2 of Fig. 1, Fig. 3 is a section taken substantially on line 3—3 of Fig. 1, Fig. 4 is a section taken substantially on line 4—4 of Fig. 2, Fig. 5 is a section taken substantially on line 5—5 of Fig. 1, Fig. 6 is a detail view of a portion of the supporting means for the rolls, partially broken away, and Fig. 7 is a vertical transverse section, showing the arrangement of the various rolls relative to one another.

Referring now to the drawings, and particularly with reference first to Figs. 1 and 2, the numeral 10 designates a receptacle suitably supported above the coating rolls in any desired manner and being provided with a hinged or removable lid 11. The receptacle 10 is adapted to receive therein a removable pan or the like 12 which is adapted to contain a quantity of adhesive or other bond-inducing medium which is to be used in the manufacture of the laminated glass. The pan 12 is preferably removable so as to facilitate the cleaning out thereof as well as the changing of the bond-inducing medium. Any suitable temperature control means may be associated with the receptacle 10 whereby to properly control the temperature of the adhesive material within pan 12. This may be effected, for instance, by circulating either hot water, steam or the like through the said receptacle and around the said pan. The temperature control medium may be introduced into the receptacle through an inlet 13 adjacent its bottom and discharged therefrom through an outlet 14 adjacent the top thereof.

Positioned at or near the bottom of the receptacle 10 is one or more discharge outlets 15 and, adapted to receive the bond-inducing material 16 flowing therefrom are the four coating rolls 17, 18, 19 and 20, which rolls are preferably arranged relative to one another in the manner illustrated in Fig. 7. Thus, the two upper rolls 17 and 18 are positioned directly beneath the discharge outlet or outlets 15 to receive the bond-inducing medium therebetween and these rolls may be so mounted that a slight building up of the material takes place as at 21. Associated with the roll 18 is the third roll 19, said latter roll being positioned forwardly of roll 18 and at a slightly lower level so that a straight line may be drawn through the transverse centers of the three rolls 17, 18 and 19. The fourth roll 20 associated with roll 19 is positioned therebeneath but is a little offset with respect to the vertical transverse center thereof in the direction of roll 18.

The roll 20 is adapted to contact with and coat the upper surface of a sheet of glass 21 as it is carried therebeneath upon a series of horizontally arranged rolls 22 constituting a runway or conveyor, said rolls 22 being mounted at their opposite ends in journals 23 carried on the supporting structure 24. A roll 25 similar to roll 20 is preferably positioned directly therebeneath to engage the under-surface of the glass sheet and to offset the downward pressure exerted by roll 20 upon the upper surface thereof.

It has been found from actual experience that the combination of rubber and metallic rolls works out extremely satisfactorily in the deposition of the material upon the laminations and therefore the rolls 17 and 19 are preferably of metal while the rolls 18 and 20 are of rubber. It has also been found that the most satisfactory results are obtained when the outer surface of the roll 20, adapted to contact with the sheet passing therebeneath, is perfectly cylindrical. It is preferred that at least the outer surface of this roll be made of a flexible rubber material or the equivalent thereof so that the said roll can be placed into quite intimate contact with the glass without injury thereto.

When it is desired to produce a coating or film of material 26 upon the glass sheet 21, the roll 20 is first properly adjusted relative to the roll 25 dependent upon the thickness of the sheet to be coated and also the thickness of coating desired. The discharge outlet or outlets 15 are then regulated to give the proper flow of adhesive material 16 which may be allowed to accumulate or not, as desired, at 21 in the pocket formed between the rolls 17 and 18. The rolls 17 to 20 inclusive are then positively driven in the directions indicated by the arrows in Fig. 7, and when they have all been coated with the adhesive material, due to the fact that the rolls contact with one another, the glass sheet 21 is moved forwardly by the conveyor rolls 22 between rolls 20 and 25. When the proper adjustment between the rolls is had, the roll 20 will deposit a uniform coating or film 26 upon the glass sheet. While the rolls are shown for the sake of clearness in slightly spaced relation with a film 27 of adhesive material passing therebetween, the rolls are, in actual practice, pressed quite closely together so that there is no apparent gap therebetween. Furthermore, the action of the rolls is such that a film 27 does not ordinarily flow as illustrated but, instead, the entire surface of each roll is completely coated with the material and each roll coats the next succeeding roll. However, for the purposes of illustration, the close contact and complete coverage of the rolls is not shown.

Upon proper regulation of the pressure between the various rolls 17 to 20, the pressure between roll 20 and glass sheet 21 and the speed of rotation thereof, the amount of material deposited upon the glass may be easily and accurately controlled. The best results are, of course, obtained when the peripheral speed of roll 20 is identical with the linear travel of the sheet therebeneath. It will therefore be readily seen that with the present invention it is possible to quickly, accurately and economically coat the sheets of glass with the adhesive or other bond-inducing medium, and also that the adhesive will be uniformly applied over substantially the entire area of the glass so as to facilitate and improve the subsequent uniting of the several laminations and thereby the quality of the finished product.

The present invention also contemplates the provision of novel and improved means for mounting the coating rolls 17 to 20 and for adjusting them as a unit and also relative to one another. Such means will now be described in detail.

Carried upon the supporting structure 24 at opposite ends of the coating rolls are the two fixed supporting frames 28 and 29 respectively, each comprising the spaced vertical legs 30 and 31 uniting at their upper ends to form a vertically elongated body 32 upon the upper end of which is formed a gear casing 33 offset laterally with respect to said body as illustrated in the drawings. Extending between the two gear casings 33 carried by the frames 28 and 29 and journaled at opposite ends therein is a horizontal shaft 34 having keyed thereto within each gear casing 33 a worm 35. Also journaled within each gear casing is a vertically disposed rod or shaft 36 to the upper end of which is fixed a worm gear 37 meshing with the respective worm 35 on shaft 34.

The vertical rods 36 project downwardly beyond the gear casings 33 and suspended therefrom are the two vertically movable frames 38 and 39 positioned inwardly of but adjacent to the stationary frames 28 and 29 respectively and slidably associated therewith. The bolts 36 are threadedly received at their lower ends within offset portions 40 carried by frames 38 and 39, so that the said frames are hung therefrom. The shaft 34 projects outwardly beyond one of the gear casings 33 and carries an adjusting wheel 41. Upon rotation of this wheel, a rotary motion will, of course, be imparted to shaft 34 and thence to worm gears 37 through worms 35. The rotation of the worm gears 37 will cause the rods 36 to be threaded through the offset portions 40 so as to effect either the raising or lowering of supporting frames 38 and 39.

Each vertically movable frame 38 and 39 comprises the two spaced vertical legs 42 and 43 having slidable connection with the legs 30 and 31 of the frames 28 and 29 as clearly illustrated in Fig. 4. Each movable frame also includes the spaced forwardly directed horizontal portions 44 and 45 and the two spaced arms 46 and 47 inclined with respect to portions 44 and 45 and extending in substantially the opposite direction.

The supporting roll 25 positioned beneath coating roll 20 is carried upon a shaft or trunnions 48 journaled within fixed bearing blocks 49 received between the legs 30 and 31 of stationary frames 28 and 29. The shaft or trunnions 50 carrying the roll 20 are journaled within bearing blocks 51 positioned between the depending legs 42 and 43 of movable frames 38 and 39, being supported upon fixed members 52 carried thereby. Also carried upon the members 52 are wedge elements 53 which are received within openings 54 formed in the bottom surfaces of the bearing blocks 51. With such an arrangement, it will be apparent that, by moving the wedges 53 inwardly or outwardly, the elevation of the opposite ends of the roll 20 can be regulated and controlled as preferred. This is desirable in order that the said roll will have a uniform contact with the glass sheet throughout its length. The wedges 53 are provided at opposite ends with threaded portions 55 and 56 upon which are received nuts 57 and 58. Upon the loosening of one nut and the tightening of the other, the wedge can be moved in the direction desired so as to effect either a raising or a lowering of the corresponding end of roll 20, after which a tightening of the nuts will serve to retain the said wedge in its adjusted position.

Slidably received between the horizontal portions 44 and 45 of each movable frame 38 and 39 is a bearing block 59, which blocks rotatably support the shaft or trunnions 60 of roll 19. The horizontal portions 44 and 45 are connected at their outer ends by plates 61. Slidably mounted between the spaced arms 46 and 47 of frames 38 and 39 are the bearing blocks 62 and 63 within which are journaled the shafts or trunnions 64 and 65 supporting the rolls 17 and 18 respectively.

The shafts or trunnions 48, 50, 60, 65 and 64 for the rolls 25, 20, 19, 18 and 17 respectively are adapted to be driven from a common driving means in the following manner: Thus, there is arranged outwardly at one end of the rolls a gear housing 66 within which are positioned the gears 67, 68, 69, 70 and 71 mounted upon shafts 72, 73, 74, 75 and 76 respectively, which are connected by means of universal joints 77 with the shafts or trunnions 64, 65, 60, 50 and 48 of the rolls 17, 18, 19, 20 and 25 respectively. The several gears 67 to 71 are in mesh with one another as illustrated in Fig. 5 so that they are caused to rotate in the directions indicated by the arrows. One of the shafts and, as here shown, shaft 75, is positively driven from a motor 78 through a drive shaft 79 driven from the said motor through any suitable drive connections. For example, the motor 78 may be supported upon a standard 80 and the shaft 81 thereof may have keyed thereto a sprocket gear 82 about which is trained a sprocket chain 83 also trained about a sprocket gear 84 fixed upon shaft 85 journaled in the walls of housing 86. Also keyed to shaft 85 is a worm 87 meshing with a worm gear 88 carried by shaft 79. Upon operation of motor 78, it will be readily apparent that through the driving means above described, the rolls 17 to 25 will be driven in the desired directions.

As pointed out above, during the operation of the machine, the coating rolls 17, 18, 19 and 20 are, in effect, maintained in relatively close contact with one another and that the entire surface of each roll is completely covered with the coating medium. Thus, the roll 17 may be urged toward and into contact with roll 18, and roll 18 into contact with roll 19 either by hydraulic or pneumatic means. For instance, there may be carried by each supporting frame 38 and 39 at the outer ends of the spaced arms 46 and 47 a cylinder 89 within which operates a piston 90. Carried by the piston is a plunger 91 which projects beyond the cylinder and engages the adjacent end of the respective bearing block 62 of roll 17. Communicating with each cylinder in back of the piston 90 is a supply pipe 92 by means of which either air, water, or the like may be forced into the cylinder to build up a suitable pressure therein. The pipes 92 for the cylinders 89 are preferably connected to a main pipe 93 leading to a suitable source of power. Upon building up of the pressure within the cylinders 89, it will be readily apparent that the pistons 90 will be forced downwardly to move the plungers 91 into engagement with bearing blocks 62 and urge them toward bearing blocks 63, and that the said bearing blocks 63 will in turn be forced toward bearing blocks 59, whereby the three rolls 17, 18 and 19 will be urged toward and maintained in contact with one another.

The bearing blocks 59 for the roll 19 are slidable between the spaced portions 44 and 45 so as to maintain the roll 19 in proper relationship with respect to rolls 18 and 20. This adjustment may be accomplished by means of the cam rods 94 passing vertically through cam openings 95 in the said bearing blocks 59. As best shown in Fig. 3, the lower end portion of each rod 94 is offset with respect to the upper end thereof as indicated at 96 and the opening 95 is similarly shaped. Inserted within the side walls of opening 95 at approximately opposite points are the wear members 97 and 98. The rod 94 is prevented from rotating but is adapted for vertical sliding movement, the upper end thereof being received within a housing 99 and having threaded thereupon a worm gear 100 meshing with a worm 101 carried by shaft 102 and being operable by a hand wheel 103 secured to the said shaft at one end thereof. Of course, the shaft 102 extends longitudinally of the coating rolls and carries at opposite ends the worms 101 within the two housings 99 so that the rods 94 may be operated simultaneously. With such an arrangement, when the rods 94 are moved downwardly through openings 95, the inclined portions 104 thereof engaging wear member 97 will move the bearing blocks 59 outwardly and thereby cause the roll 19 to be moved away from rolls 18 and 20. On the other hand, when the bolt is then threaded upwardly, the inclined surface 105 thereof engaging wear member 98 will cause the bearing blocks 59 to be moved inwardly so as to bring the said rolls closer together.

In accordance with the present invention, it is desirable during the time that the machine is not in operation to clean the coating rolls and then move the said rolls away from and out of contact with one another since, in the event they are permitted to remain in contact while stationary and with the adhesive material thereupon, the said material may have an injurious effect on said rolls. Consequently, when placing the machine out of operation, the supply of adhesive or other bond-inducing medium to the coating rolls is first discontinued, after which the rolls may be washed by feeding a supply of water thereto in substantially the same manner as the coating material. The pressure within cylinders 89 is then released and the roll 19 moved away from and out of contact with rolls 18 and 20 by sliding the bearing blocks 59 forwardly upon downward movement of cam rods 94 in the manner above described.

The forward movement of roll 19 is also adapted to effect movement of the rolls 17 and 18. Thus, the forward movement of roll 19 will also serve to move roll 18 away from roll 17 due to the provision of the links 106 pivoted at one end to the bearing blocks 59 as at 107 and having elongated slots 107' in their opposite ends for receiving pins 108 carried by bearing blocks 63. Likewise, the forward movement of roll 19 is adapted to move roll 17 outwardly away from roll 18 and this is effected by means of suitable linkage mechanism including the links 109 pivoted at one end to bearing blocks 59 as at 110 and also pivoted intermediate their ends as at 111 to the movable frames. Pivotally connected to the outer end of links 109 are link rods 112 provided at their opposite ends with an offset portion 113 having an elongated slot 113' therein receiving pin 114 carried by bearing blocks 62. Upon forward movement of the roll 19, the links 106 will serve to also draw the roll 18 forwardly and simultaneously the link 109 swinging in a clockwise direction about its pivot 111 will move the link rod 112 rearwardly to force the roll 17 outwardly away from roll 18. The purpose of the elongated slots 107' and 113' is to permit of the inward movement of rolls 17 and 18 toward roll 19 upon operation of the hydraulic or pneumatic means. Inasmuch as the intermediate roll 18 is formed of rubber or some other suitable flexible material, the said roll will of course be slightly compressed upon operation of the said hydraulic or pneumatic means so that the bearing blocks 62 and 63 for the rolls 17 and 18 respectively must be permitted to move inwardly. Furthermore, due to the provision of the elongated slots 107' in links 106, the roll 19 may be moved outwardly away from roll 18 a slight distance before the said roll 18 is moved away from roll 17 so that there will be a slight separation between rolls 18 and 19.

As pointed out above, the thickness of the coating 26 of adhesive material applied to the glass sheet 21 is governed largely by the space between the roll 20 and the glass sheet. In order to accurately gauge this distance, there is provided an indicator gauge 115 carried upon a bracket arm 116 secured to the stationary frame 28. This indicator gauge may be of conventional construction including the usual hand 117 rotatable about the face 118 by operation of the vertically movable plunger 119. Carried by the vertically movable frame 38 is an actuating member in the nature of a bolt 120 threaded within the boss 121 formed on portion 44. Upon raising of the rolls 17 to 20, due to vertical movement of the supporting frames 38 and 39, the actuating member 120 engaging plunger 119 will effect movement of the pointer 117 over the face of the gauge and will in this way indicate to the operator the distance between the roll 20 and the glass sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, bearing blocks slidably carried by said movable frames and within which said rolls are mounted, and means for effecting movement of said movable frames relative to the stationary frames.

2. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, vertically movable frames slidably associated with said stationary frames, bearing blocks slidably carried by said movable frames and within which said rolls are mounted, and means carried by the stationary frames for supporting said movable frames and for also effecting vertical adjustment thereof relative to said stationary frames.

3. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, vertically movable frames slidably associated with said stationary frames, bearing blocks slidably carried by said movable frames and within which said rolls are mounted, means carried by the stationary frames and engaging said movable frames for suspending the latter from the former, and means for actuating said suspending means to effect vertical adjustment of the movable frames relative to the stationary frames.

4. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, bearing blocks slidably carried by said movable frames and within which said rolls are mounted, means for effecting movement of said movable frames relative to the stationary frames, and means for moving the rolls carried by said movable frames relative to one another.

5. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, vertically movable frames slidably associated with said stationary frames and within which said rolls are mounted, means carried by the stationary frames for supporting said movable frames and for also effecting vertical adjustment thereof relative to said stationary frames, and means carried by said movable frames for moving the said rolls toward and away from one another.

6. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, bearing blocks slidably carried by said movable frames and within which said rolls are mounted, means for effecting movement of said movable frames relative to the stationary frames, and means carried by the movable frames for independently raising and lowering the opposite ends of the said roll with which the sheet contacts.

7. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, bearing blocks slidably carried by said movable frames and within which said rolls are mounted, means for effecting movement of said movable frames relative to the stationary frames, means for moving the rolls carried by said movable frames relative to one another, and means carried by the movable frames for independently raising and lowering the opposite ends of the said roll with which the sheet contacts.

8. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames and within which said rolls are mounted, and fluid controlled means carried by said movable frames for urging certain of the rolls toward other of said rolls.

9. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, means carried by said movable frames for movably supporting the rolls, and fluid controlled means carried by the movable frames and acting against the movable supporting means of one roll for urging certain of the rolls toward other of said rolls.

10. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, means for movably supporting the rolls, means for moving one of said rolls toward and away from an adjacent roll, and connecting means between said first roll and the adjacent roll for effecting movement of the said adjacent roll in the same direction as the first roll upon movement of the latter.

11. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, means for movably supporting the rolls, means for moving one of said rolls toward and away from a second roll, connecting means between said first and second named rolls for effecting movement of the said second roll in the same direction as the first roll upon movement of the latter, and connecting means between said first roll and a third roll for moving the latter away from the second roll and in a direction opposite to the direction of movement of the said first roll upon movement of the latter roll.

12. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, means carried by said movable frames for movably supporting the rolls, means for moving one of said rolls toward and away from an adjacent roll, and connecting means between said first roll and the adjacent roll for effecting movement of the former.

13. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, means carried by said movable frames for movably supporting the rolls, means for moving one of said rolls toward and away from a second roll, connecting means between said first and second named rolls for effecting movement of the latter upon movement of the former, and connecting means between said first roll and a third roll for moving the latter away from the second roll upon movement of the first mentioned roll.

14. In apparatus of the character described for applying a bond-inducing medium to sheets for use in the manufacture of laminated glass, a plurality of rolls adapted to carry a film of bond-inducing medium, means for supporting the sheet and passing it in contact with one of said rolls to coat the same, means for supporting the rolls including spaced stationary supporting frames, movable frames slidably associated with said stationary frames and within which said rolls are mounted, means for effecting movement of said movable frames relative to the stationary frames whereby to raise and lower said rolls as a unit relative to the said supporting means, and means actuated upon movement of the said movable frames for indicating the distance between the roll with which the sheet contacts and the said supporting means.

15. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames and within which said rolls are mounted, means for effecting movement of said movable frames relative to the stationary frames whereby to raise and lower the rolls as a unit, an indicator gauge carried by one of said stationary frames, and an actuating member carried by one of the movable frames and adapted to effect operation of said indicator gauge upon vertical movement of the movable supporting frame.

16. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, means for supporting the rolls including spaced stationary supporting frames, movable frames slidably associated with said stationary frames, bearing blocks slidably carried by said movable frames and within which said rolls are mounted, and means positioned above the rolls and containing the bond-inducing medium, said last-mentioned means having an outlet through which the bond-inducing medium is caused to flow downwardly to said rolls.

17. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, bearing blocks slidably carried by said movable frames and within which said rolls are mounted, and fluid controlled means for urging certain of the rolls toward other of said rolls.

18. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, bearing blocks slidably carried by said movable frames and within which said rolls are mounted, and fluid controlled means carried by said movable frames for urging certain of the rolls toward other of said rolls.

19. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, bearing blocks slidably carried by said movable frames and within which said rolls are mounted, means for moving one of said rolls toward and away from an adjacent roll, and connecting means between said first roll and the adjacent roll for effecting movement of the latter upon movement of the former.

20. In apparatus of the character described for applying a bond-inducing medium to sheets for use in the manufacture of laminated glass, a plurality of rolls adapted to carry a film of bond-inducing medium, means for passing a sheet in contact with one of said rolls to coat the same, and means for supporting the rolls including spaced stationary supporting frames, movable frames slidably associated with said stationary frames, bearing blocks slidably carried by said movable frames and within which said rolls are mounted, means for moving one of said rolls toward and away from a second roll, connecting means between said first and second named rolls for effecting movement of the latter upon movement of the former, and connecting means between said first roll and a third roll for moving the latter away from the second roll upon movement of the first mentioned roll.

BERNARD C. CASE.
CONRAD B. SCHAFER.